Nov. 28, 1961    J. F. SAUTER    3,011,148
CHECK CIRCUIT FOR A REGISTRATION SYSTEM
Filed Aug. 13, 1958    4 Sheets-Sheet 1

—✕— = MAKE CONTACT
—┼— = BREAK CONTACT

EACH RELAY CONTACT BEARS THE DESIGNATION
OF ITS CONTROLLING RELAY WINDING FOLLOWED
BY A DIGIT INDIVIDUAL TO THE CONTACT.

INVENTOR
J. F. SAUTER
BY
ATTORNEY

INVENTOR
J. F. SAUTER

Nov. 28, 1961     J. F. SAUTER     3,011,148
CHECK CIRCUIT FOR A REGISTRATION SYSTEM
Filed Aug. 13, 1958     4 Sheets-Sheet 4

INVENTOR
J. F. SAUTER
BY
Donald M Quft
ATTORNEY

3,011,148
CHECK CIRCUIT FOR A REGISTRATION SYSTEM

Jack F. Sauter, Bayside, N.Y., assignor to Bell Telephone Laboratories, Incorporated, New York, N.Y., a corporation of New York
Filed Aug. 13, 1958, Ser. No. 754,744
18 Claims. (Cl. 340—147)

This invention pertains to a data error checking circuit and, more particularly, to a data register error checking circuit for ascertaining the accuracy as well as the plausibility of registered data. The growing importance of the data processing art together with the concomitant increasing interchange of data between equipment units renders highly desirable the availability of a simple and inexpensive means for checking received and transmitted data for identity.

It is common practice at the present time to transmit data in combinational code form, such as in the well known two-out-of-five code. It is often not only desirable, but necessary, that assurances be had that the transmitted data is received and stored error free in a receiving register. In this connection, it is well known to equip such a receiving register with a so-called "two-out-of-five" check circuit to ascertain that the register operates in a plausible manner during each registration. A check circuit of this type is shown on Figs. A and B of page 62 of the Design of Switching Circuits by Keister, Ritchie and Washburn published in 1951 by the D. Van Nostrand Company. These figures disclose the typical two-out-of-five symmetrical network which closes a path from its input through to its output only in the event that two and only two of the five associated relays are operated at any one time. This network often comprises part of the energizing circuit of a check relay, thereby enabling the check relay to operate only upon closure of the network.

Although check circuits of this type are well suited for the purposes for which they were designed, they are limited in their usefulness in that they check only the plausibility, rather than the correctness of the registered data. For example, referring to Fig. B on page 62 of said book, let it be assumed that relays A and B are operated to represent certain information. In this case a path is closed from the input, through make contacts on relays A and B, through break contacts on relays C, D and E to the output. The closure of this circuit, however, insures only that two out of the five relays, rather than the correct two, have operated. For example, let it again be assumed that although the data pertaining to a single registration would properly be manifested by the operation of relays A and B that, due to some circuit defect, relays D and E operated, rather than relays A and B. In this case, the circuit from the input to the output lead on Fig. B would be closed through the break contacts of relays A through C and the make contacts of relays D and E. Therefore, the use of a check circuit of this type, or any other check circuit which relies solely on the use of a symmetric circuit to close a path from its input to its output, only insures that the proper number of relays operate during each registration.

Error checking systems are not unknown in the data processing art. For example, one of the more popular methods currently used to ascertain the validity of registered data comprises the dual registration of the received data followed by a comparison of the two sets for identity. Although error checking systems of this complexity may be suitable for use with large electronic computers and data processing systems, the concomitant size, complexity and expense of such systems renders them unsuitable for use in applications of a more modest nature such as, for example, relay register circuits. It is, therefore, apparent that the provision of a simple and inexpensive check circuit which insures the correctness as well as the plausibility of the registered information would be a substantial advancement in the data processing and transmission art.

An object of this invention relates to provision of an improved error checking circuit for a registration system.

A further object of the invention relates to the provision of an error checking circuit for use with a registration system whereby a check is made on the correctness as well as the plausibility of the information registered therein.

A further object of the invention relates to the provision of an error checking circuit for use at a data transmission center for detecting any errors between the data transmitted therefrom and that registered in a distant receiving register circuit.

The error checking circuit comprising the present invention is disclosed herein in combination with both a single and a plural order registration system. Since a single order system is merely a simplification of the plural order system, the following general discussion is directed to the use of the error checking circuit with a plural order register.

In accordance with the present invention the data sending circuit may advantageously comprise a plurality of groups of contacts which, when selectively operated, effect the operation of a plurality of relays in a distant receiving register to represent in combinational code form the numerical value of the digit associated with the operated contacts in the sending circuit. In the specific embodiment disclosed herein, the sending circuit is arranged to effect the registration of digits 0 through 9 in two-out-of-five code form in a distant receiving register. Each order of the receiving register comprises five relays. Five signal leads individual to each order interconnect each set of five relays with the contact groups in the sending circuit so that the operation of the sending contacts effects the operation of the desired pair of relays in each order of the register.

The error checking circuit is associated with the sending circuit in such a manner that a first check relay operates in response to the operation of the correct two relays in each order of the register during a registration while a second check relay operates only in the event that an unwanted relay in any order of the register operates. After the sending contacts have been operated, the operating circuit of the first check relay is interconnected through the operated sending contacts to the windings of the relays in the receiving circuit which should be operated at this time. If the correct two relays in each order are operated, a ground is supplied from their locking contacts over the wires leading to the sending circuit. These grounds are then fed back through the operated sending contacts to operate the first check relay. This relay is of the marginal type and is adjusted to operate only in the event that it detects ground on the windings of all relays in the receiving register with which it is interconnected at this time. The operation of less than all of the proper receiving register relays will not operate it.

At the same time the first check relay is interconnected with the desired two relays in each order of the register, the second check relay is interconnected, by means of the operated sending contacts, to the windings of the three register relays in each order which should not operate. If due to a cross-connection or other circuit defect an undesired relay had operated, a ground from its make contacts would be transmitted back through the sending circuit contacts to the winding of the second check relay to operate it. Together, the provision of these two check relays insures that the proper two register relays have operated during each registration and that no undesired relays have operated.

A feature of the invention is the provision of a register check circuit which indicates whether the desired relays in a register are operated during each registration.

A further feature of the invention is the provision of a register check circuit having a plurality of inputs which manifests the operation of the correct register relays during each registration upon the application of operating potential to al lof its inputs.

A further feature of the invention is the provision of a register check circuit which indicates whether the desired relays operate during each registration and, additionally indicates whether an unwanted relay operates during each registration.

A further feature of the invention is the provision of an error checking circuit in combination with a register comprising a plurality of relays for storing digital data in combinational code form whereby the operation of the proper combination of relays during each registration applies an operating potential to a plurality of inputs of said checking circuit thereby operating it to manifest the registration of the desired data.

A further feature of the invention is the provision of an error checking circuit in combination with a register comprising a plurality of relays adapted to register digital data in combinational code form whereby the operation of an unwanted relay during any registration applies an operating potential to a check circuit which operates and manifests the improper operation of the register.

A further feature of the invention is the provision of an error checking circuit in combination with a plural order register comprising a plurality of relays in each order for storing digital data in combinational code form therein and whereby the operation of the proper combination of relays during each registration applies an operating potential to a plurality of inputs of said checking circuit thereby operating it to manifest the registration of the desired data.

These and other objects and features of the invention will become apparent from a reading of the following description taken in conjunction with the drawings in which.

Relay contacts are shown separated from their associated windings on the present drawings. Contacts which are closed when a relay is operated (make contacts) are represented by an X superimposed on the interconnecting conductors while contacts which open upon the operation of a relay (break contacts) are represented by a short line intersecting the connecting conductors.

The first digit of each relay designation indicates the figure on which the relay winding appears while the remainder of the designation indicates the function of the relay. Thus, the windings of relays 1-CON and 1-A2 appear on FIG. 1 while the windings of relays 3-CON and 3-A2 appear on FIG. 3. The designation of the relay contacts includes the designation of the controlling relay winding followed by a digit individual to each contact. For example, contacts 1-CON-1 and 1-CON-2 appear on FIG. 1 and are operated upon the energization of the winding 1-CON, while contacts 3-A2-1 appear on FIG. 3 and are operated upon the energization of the winding 3-A2.

Figure 1:
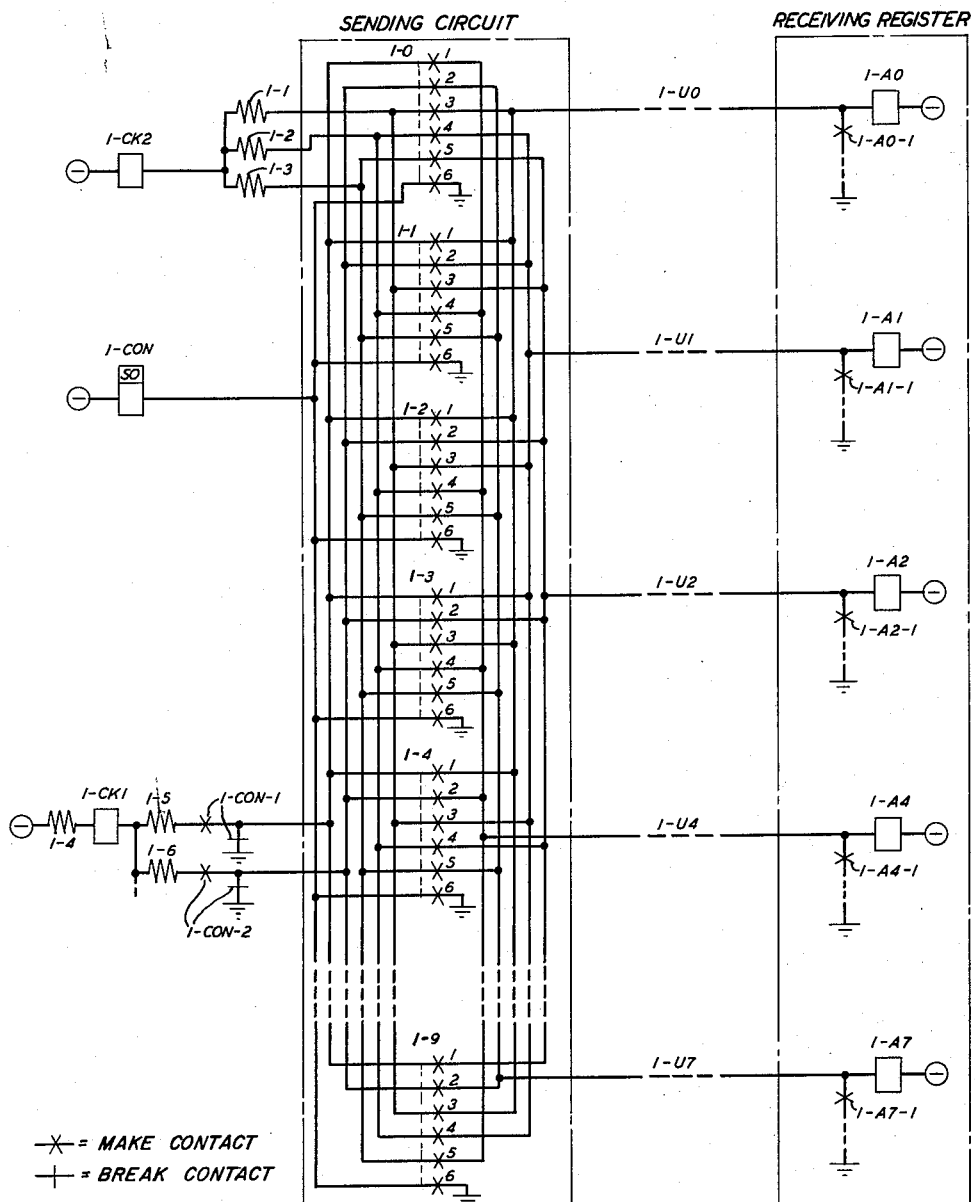
FIG. 1 represents a first exemplary embodiment of the invention.

*Embodiment of FIG. 1*

The registration system disclosed in FIG. 1 comprises a receiving register, a sending circuit, five leads interconnecting the two circuits, together with three relays comprising part of the check circuits. The sending circuit comprises ten groups of contacts designated 1-0 through 1-9. Each group contains six make contacts and could comprise either relay contacts or the contacts of manually operable keys. Each such group of contacts on FIG. 1 is interconnected by a dotted line. The operation of any one of the ten contact groups converts the digit represented thereby into a two-out-of-five code form and transmits it over the appropriate conductors, 1-U0, 1-U1, 1-U2, 1-U4, 1-U7, to operate two relays in the receiving register which store in two-out-of-five code form the digit represented by the operated contact group in the sending circuit.

Assume that contact group 1-4 in the sending circuit is momentarily operated to effect the registration of the digit 4 in the receiving register. At this time a ground is extended through break contacts 1-CON-2 of relay 1-CON, through make contacts 2 of contact group 1-4, over lead 1-U4 to the winding of relay 1-A4 which operates and closes a locking path to ground through its make contact 1-A4-1. At the same time, a ground is also extended from break contacts 1-CON-1, through make contacts 1 of contact group 1-4, over lead 1-U0 to operate relay 1-A0 which locks to ground over its make contacts 1-A0-1. The closure of contact group 1-4 also extends a ground from its contacts 6 to operate relay 1-CON, which is of the slow operate type and is sufficiently slow in operating so that the receiving register relays operate and lock before relay 1-CON operates. The operation of relay 1-CON opens its break contacts 1-CON-1 and 1-CON-2 and, at the same time, closes its like designated make contacts which, by means of resistors 1-5 and 1-6, interconnect the winding of relay 1-CK1 with the windings of relays 1-A0 and 1-A4.

In the event that the proper two receiving register relays (relays 1-A0 and 1-A4) are now operated, the grounds on their make contacts will be extended over leads 1-U0 and 1-U4, respectively, through contacts 1 and 2, respectively, of contact group 1-4, through make contacts 1-CON-1 and 1-CON-2, respectively, through resistors 1-5 and 1-6, respectively, to the winding of relay 1-CK1 to operate it. This relay is of the marginal type and is adjusted so that it will operate only in the event that grounds are supplied thereto through both resistors 1-5 and 1-6. The presence of a ground on only one of these resistors will not supply sufficient current to operate the relay. Therefore, relay 1-CK1 operates subsequent to the operation of one of the ten contact groups in the sending circuit provided that the correct two register relays operated to store in two-out-of-five code form the digit represented by the operated contacts in the sending circuit.

The winding of relay 1-CK2 is interconnected by means of resistors 1-1, 1-2, and 1-3, during each registration to the windings of the three relays in the receiving register which should remain unoperated. Again, assuming that contact group 1-4 is operated, relay 1-CK2 is interconnected by means of said resistors and contacts 3, 4, and 5 of contact group 1-4 with the windings of relays 1-A1, 1-A2, and 1-A7, respectively, in the register. Therefore, if, due to a circuit defect, one or more of these relays operate in response to the operation of contact group 1-4, the ground supplied by its locking contact will be extended through the sending circuit to operate relay 1-CK2, thereby manifesting an improper operation of the register. For example, if relay 1-A7 should be operated for some reason, the ground supplied by its make contacts 1-A7-1 would be extended over signal leads 1-U7, through make contacts 5 of contact group 1-4, through resistor 1-3, to the winding of relay 1-CK2 to operate it.

Resistors 1-1, 1-2, 1-3 are used to prevent a false ground from operating more than one unwanted relay in the receiving circuit. The value of these resistors is such that when a current flows through two of them in series it is limited sufficiently to prevent receiving circuit relays from operating.

Figure 2:
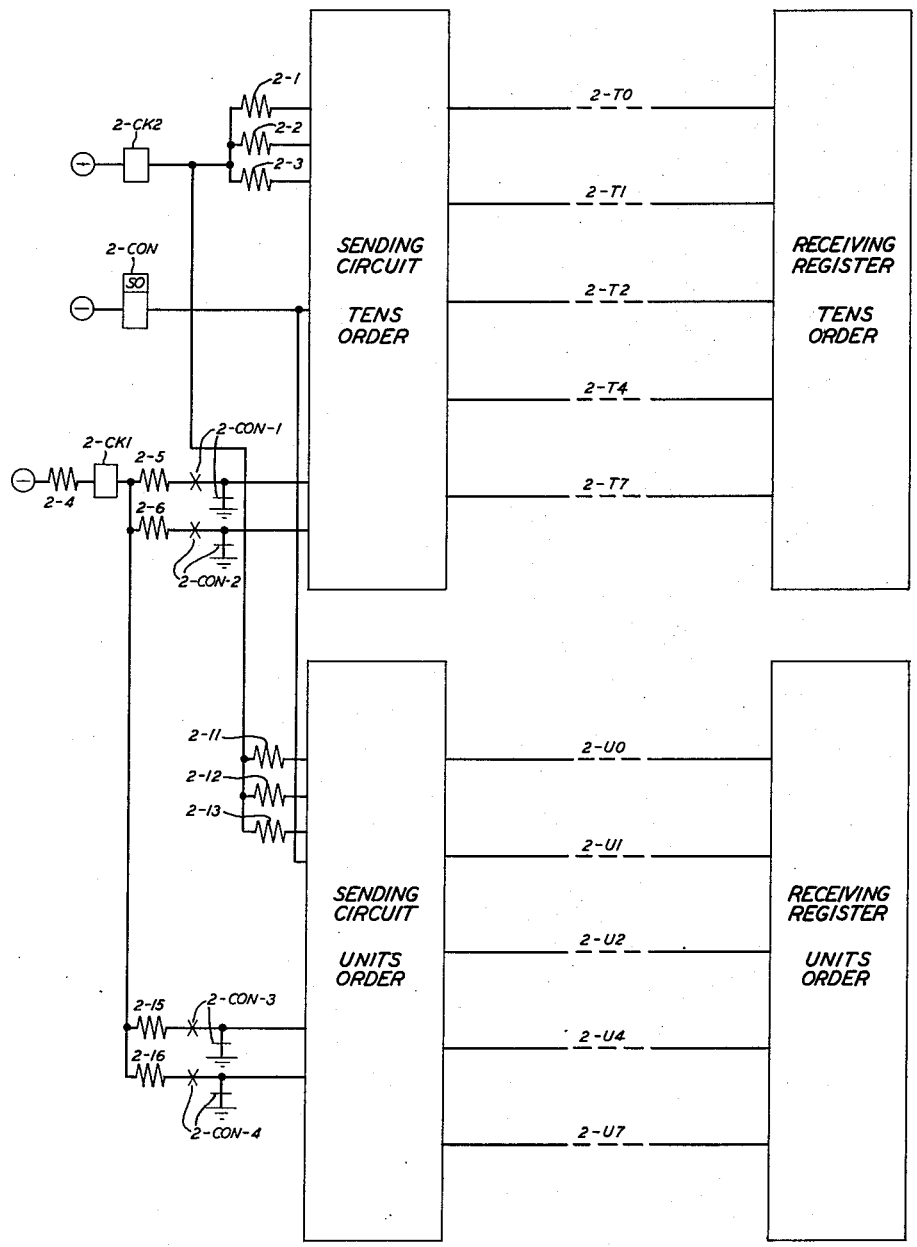
FIG. 2 illustrates how the circuit of FIG. 1 may be expanded to provide error checking for a plural order registration system.

*Embodiment of FIG. 2*

The embodiment of FIG. 2 discloses how the check circuit of FIG. 1 may be used with a plural order register. FIG. 2 discloses two sending circuits in diagrammatic form, one for the tens order and one for the units order. Both of these circuits are identical to the sending circuit of FIG. 1. Also, FIG. 2 contains two receiving registers of the type shown in FIG. 1. Five signal leads interconnect each sending circuit with its associated receiving register.

The operation of the circuit of FIG. 2 is similar to that of FIG. 1. Upon the closure of the desired contact group in the sending circuit for the tens order, operating grounds are supplied from break contacts 2–CON–1 and 2–CON–2, through the make contacts of the operated contact group, over the appropriate two signal leads, to operate the desired two relays in the receiving register for the tens order. At the same time, closure of a contact group in the units order sending circuit extends grounds from the break contacts 2–CON–3 and 2–CON–4, through make contacts of the operated contact group, over the appropriate two signal leads, to operate the desired two relays in the units order receiving register. The operation of the contact groups in the tens and units order sending circuits also closes a path to operate relay CON, which, as in FIG. 1, is of the slow operate variety. Upon the operation of this relay, break contacts 2–CON–1, 2–CON–2, 2–CON–3 and 2–CON–4 open while the like designated make contacts close to extend the grounds from the locking contacts of the four operated relays in the receiving registers to relay 2–CK1 to operate it. This relay is adjusted so that it operates only in the event that ground are supplied to the right-hand side of all of resisors 2–5, 2–6, 2–15, and 2–16.

In a similar manner to FIG. 1, relay 2–CK2 is interconnected by means of resistors 2–1, 2–2, 2–3, 2–11, 2–12, and 2–13 with the windings of the three relays in each register which should not operate during each registration. The operation of any unwanted relay applies a ground from its make contacts back through the sending circuit to relay 2–CK2 to operate it, thereby manifesting improper operation of the registers.

If desired, the principles disclosed on FIG. 2 could be extended to additional orders of a register. All that would be necessary in this case would be to interconnect the windings of the two desired relays in each order with the winding of relay 2–CK1 during each registration. Similarly, the winding of relay 2–CK2 would be interconnected during each registration with the windings of the three unwanted relays in each order. Relay 2–CK1 would, of course, have to be readjusted so as to operate only in the event that operating grounds are applied thereto from all the desired relays that should operate during the registration.

Figure 3:
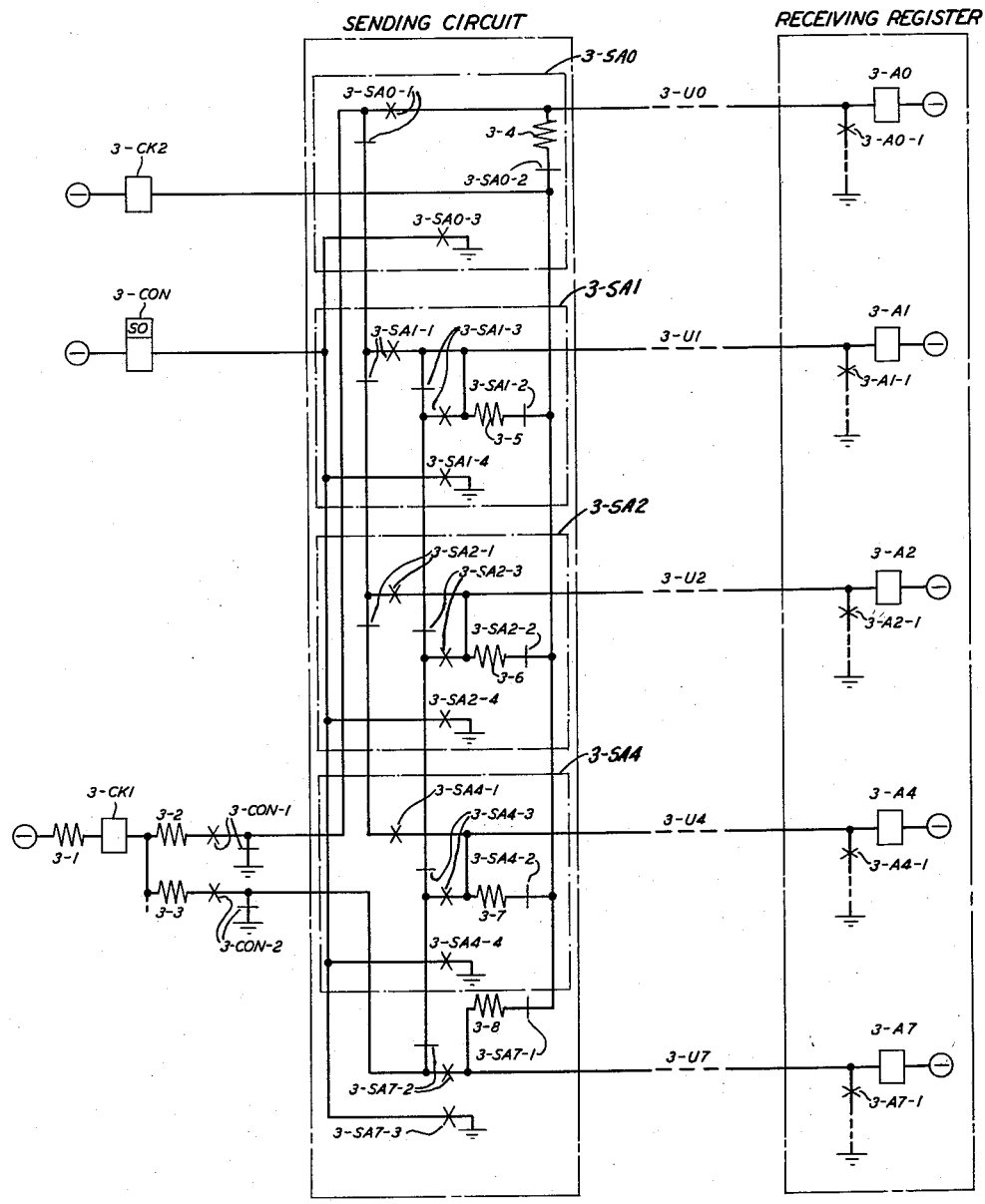
FIG. 3 illustrates a second exemplary embodiment of the invention.

*Embodiment of FIG. 3*

The circuit of FIG. 3 is similar to that of FIG. 1 except that the sending circuit has five contact groups which are arranged to be operated on a two-out-of-five basis. The contacts on FIG. 3 comprising a simultaneously operating group are enclosed within a dashed rectangle. Thus, all the contacts comprising the 3–SA0 group are contained within the rectangle 3–SA0 and all such contacts are operated simultaneously by the particular means chosen to effect the operation of the contacts whether it be a manually operable key or the winding of a relay. Again, assume that the digit 4 is to be registered in a two-out-of-five basis in the receiving register. In this case, contact groups SA0 and SA4 are operated in the sending circuit. Contact group SA0 contains three contacts designated 3–SA0–1, 3–SA0–2, 3–SA0–3 while contact group SA4 contains four contacts designated 3–SA4–1 through 3–SA4–4. Upon the operation of these two contact groups, a ground is extended through break contacts 3–CON–2 of relay 3–CON, break contacts 3–SA7–2, make contacts 3–SA4–3, signal lead 3–U4, to the winding of relay 3–A4 which operates and closes a locking path to ground for itself over its make contacts 3–A4–1. A ground is also extended from break contacts 3–CON–1, make contacts 3–SA0–1, signal lead 3–U0, to the winding of relay 3–A0 which operates and closes a holding path to ground for itself through its make contacts 3–A0–1.

The closure of make contacts 3–SA0–3 and 3–SA4–4 extends a ground to operate the slow operate relay 3–CON. The operation of this relay opens break contacts 3–CON–1 and 3–CON–2 and closes its like designated make contacts to interconnect the winding of relay 3–CK1 through resistors 3–2 and 3–3 to the holding ground of relay 3–A0 and 3–A4. As before, relay 3–CK1 is adjusted so that it operates only in the event that an operating ground is supplied to both resistors 3–2 and 3–3, thereby manifesting the operation of the desired two relays in the receiving register.

The winding of relay 3–CK2 is interconnected with the windings of the three relays in the receiving register which should not operate during a registration. For example, relay 3–A7 should be unoperated at this time. Therefore, a circuit may be traced from the winding of relay 3–A7, signal lead 3–U7, through resistor 3–8, break contacts 3–SA7–1, to the winding of relay 3–CK2. A similar circuit may be traced to interconnect each of relays 3–A1 and 3–A2 with the winding of relay 3–CK2. If, due to a circuit defect, one or more of these relays should operate at this time, the holding ground supplied by their make contacts will be extended through the sending circuit to operate relay 3–CK2, thereby manifesting on improper operation of the receiving register.

Figure 4:
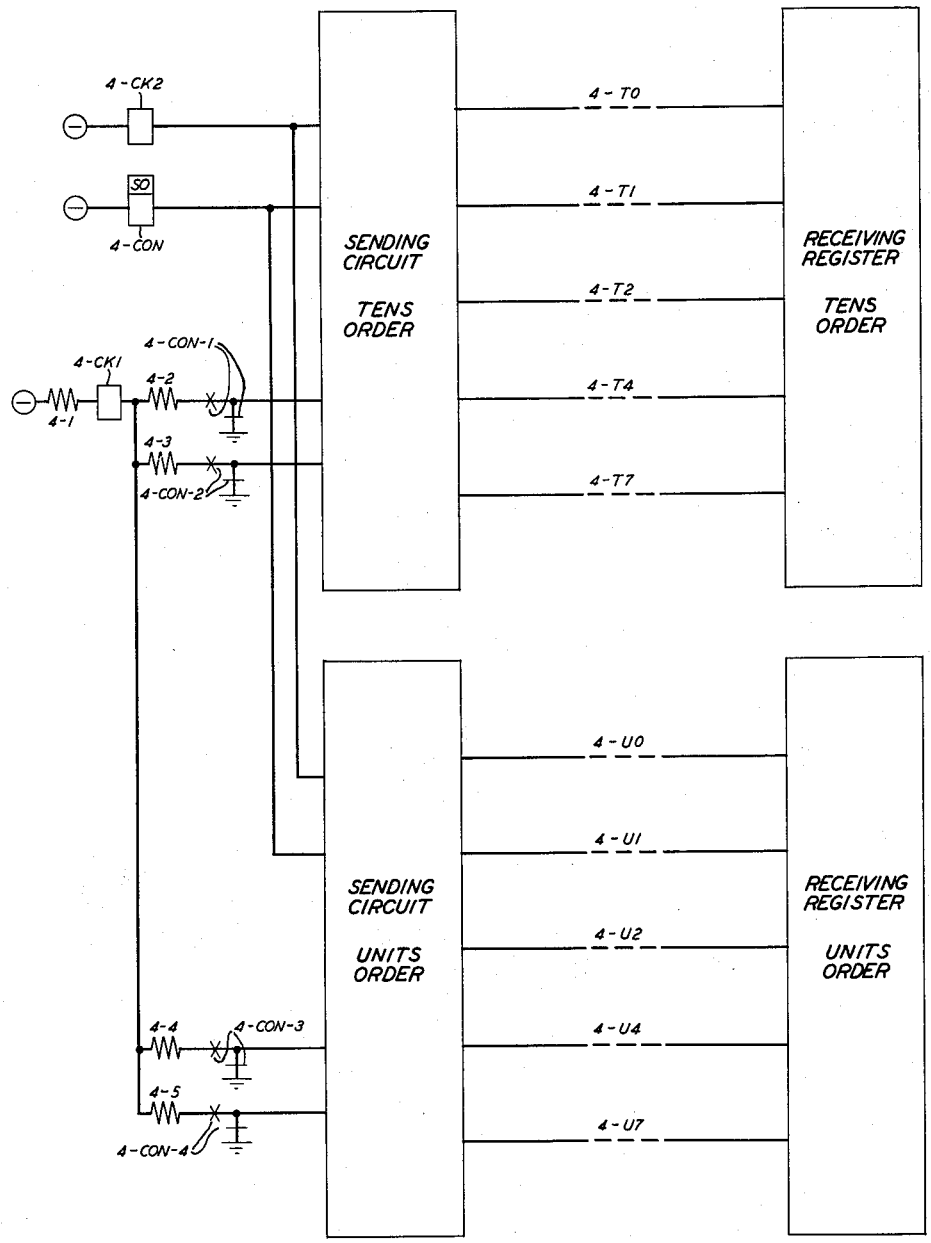
FIG. 4 shows how the circuit of FIG. 3 may be expanded to provide error checking for a plural order registration system.

*Embodiment of FIG. 4*

The embodiment of FIG. 4 applies the principles disclosed in FIG. 3 to a plural order register in a manner similar to which the circuit of FIG. 2 applied the principles shown in FIG. 1 to a plural order register. FIG. 4 discloses sending and receiving circuits together with the appropriate interconnecting leads for the tens and units order of a registration system. Break contacts 4–CON–1 through 4–CON–4 supply the operating grounds for the desired two relays in each order of the register during a registration, whereupon relay 4–CON operates and by means of its like designated make contacts interconnects the holding grounds of the desired two operated register relays in each order with the winding of relay 4–CK1 in series with resistors 4–2 through 4–5. As was the case with FIG. 2, relay 4–CK1 operates only in the event that an operating ground is supplied thereto through all of resistors 4–2 through 4–5, thereby manifesting the proper operation of the relays in each register.

Relay 4–CK2 is similarly interconnected during each registration with the windings of the three relays in each register which should not operate. Therefore, if, due to a circuit defect, one of these relays operates, the holding ground supplied thereby will be extended back through the sending circuit to operate relay 4–CK2 to manifest an improper operation of the register.

In a similar manner as described in connection with FIG. 2, the circuit disclosed in FIG. 4 may be expanded to provide a check on the proper operation of additional orders of a register.

The present invention is shown herein in its most elemental form in order to facilitate an understanding thereof. For example, the contact groups in the sending circuits are shown apart from the means which would operate them. Insofar as the present invention is concerned, it is immaterial whether the contact groups are controlled by manually operated keys or by some automatic means such as relays. Also, the circuits which would be controlled by the check relays (1–CK1 and 1–CK2 on FIG. 2, for example) are not shown since they comprise no part of the present invention.

In commercial use the registration system disclosed herein would comprise part of an automatic digit storage and registration system. The contact groups in each sending circuit would each be associated with an individual relay which would operate to effect the closure of its contacts. Also, the contacts of the two check relays would be incorporated into an additional check circuit which would operate only in the event that both of the check relays manifest correct operation of the register. For example, referring to the check circuit of FIG. 1, a pair of make contacts associated with relay 1–CK1 and a pair of break contacts of relay 1–CK2 could be connected in series as part of an additional check circuit so that a path would be completed therethrough only upon the operation of relay 1–CK1 and the nonoperation of relay 1–CK2 during each registration. This additional check circuit could be used to block further circuit operations upon a defective operation of the register.

The present drawings show only a make contact associated with the holding circuit for each register relay. It should be appreciated that additional controlling means as desired may be inserted in the holding path for each relay to effect its release once the information represented thereby has fulfilled its given purpose.

It is to be understood that the above-described arrangements are but illustrative of the application of the principles of the invention. Numerous other arrangements may be devised by those skilled in the art without departing from the spirit and scope of the invention. For example, although the receiving registers disclosed herein are arranged to operate on a two-out-of-five code basis, the check circuit comprising the present invention could be used with registers which store information in a different code, such as, for example, one out of ten. The only circuit change required would be the interconnection of the first check relay (relay 1–CK1, for example) with the register relay that should operate during each registration, while the second check relay (relay 1–CK2, for example) is connected to those register relays which should not operate during each registration.

What is claimed is:

1. A registration system comprising a plurality of register relays each having an operating path, signaling means effective during each registration to operate a desired group of said relays by applying an operating potential to their operating paths, and indicating means operable over a portion of the operating paths of said desired relays for indicating whether said desired group of relays has operated during each registration.

2. A registration system comprising a plurality of register relays each having an operating path, signaling means effective during each registration to operate a desired group of said relays by applying an operating potential to their operating paths, indicating means operable over a portion of the operating paths of said desired relays for indicating whether said desired group of relays has operated during each registration, and additional indicating means responsive to each registration for manifesting the operation of any undesired register relays.

3. A registration system comprising a plurality of register relays each having an operating path, a winding and contacts; signaling means effective during each registration to energize momentarily and simultaneously the operating paths and windings of a desired group of said register relays thereby effecting their operation, indicating means operable during each registration for indicating whether said desired relays have operated and circuit means including the contacts and a portion of the operating paths of said desired register relays for effecting the operation of said indicating means upon the operation of said desired register relays.

4. A registration system comprising a plurality of register relays; each relay having an operating path, an energizing winding and contacts; signaling means effective during each registration to energize momentarily and simultaneously the operating paths and windings of a desired group of said register relays thereby effecting their operation, indicating means operable during each registration for indicating whether said desired relays have operated, circuit means including the contacts and a portion of the operating paths of said desired relays for effecting the operation of said indicating means upon the operation of said desired register relays during a registration, and means including said last-named contacts adapted to effect continued energization of the windings of the operated register relays when said signaling means ceases to energize same.

5. A registration system comprising a plurality of relays adapted to be operated in combinational form during each registration, a first check circuit having a plurality of inputs and operable only upon application of an operating potential to all of said inputs, means responsive to the operation of the correct relays during each registration for applying operating potential to all inputs of said first check circuit thereby effecting its operation, a second check circuit, and means responsive to the operation of an unwanted relay during a registration for operating said second check circuit.

6. A registration system comprising five relays adapted to be operated in two-out-of-five code form during each registration, a first check circuit having two inputs and operable only upon application of an operating potential to both of said inputs, means responsive to the operation of the correct two relays during each registration for applying operating potential to both inputs of said first check circuit thereby effecting its operation, a second check circuit, and means responsive to the operation of any of the three unwanted relays during a registration for operating said second check circuit.

7. A registration system comprising a plurality of register relays each having an operating path, an energizing winding and contacts; a signal lead for each relay winding and connected thereto, signal means operable during each registration for applying operating potential to a desired combination of said signal leads thereby simultaneously and momentarily energizing a desired group of said windings to operate a desired group of said relays in accordance with the information to be registered, a unique combination of windings being energized per registration and consisting of a plural number less than all of said windings, a check circuit operable over the signal leads of said desired relays in response to the operation thereof, means including contacts on said desired relays effective to energize continuously their associated relay windings upon the cessation of operating potential from said signaling means.

8. A registration system comprising five register relays adapted to be operated in combinational form, each relay having an energizing winding and contacts, a signal lead for each winding and connected thereto, signaling means, said leads being connectable simultaneously and momentarily to said signaling means during each registration to energize a desired two of said windings and thereby operate their associated relays in accordance with the information to be registered, a check relay energizable over the signal leads of the two desired operated relays to indicate that said desired two relays have been operated, and circuit means including contacts on said desired relays for operating said check relay upon the operation of said desired two register relays, said contacts effective to energize continuously said windings of the desired two operated relays when said signal leads are disconnected from said signaling means.

9. In combination, a register circuit comprising five relays adapted to be operated in two-out-of-five code form to register any one of the digits 0 through 9 therein, a sending circuit remotely located from said register circuit and containing ten selectively operable switching means each of which represents one of digits 0 through 9, signal paths interconnecting said register circuit and said sending circuit, means whereby the operation of one of said switching means effects the operation of the two relays in said register circuit which represent in two-out-of-five code form the digit represented by said operated switching means, a check circuit associated with said sending circuit, and means including said signal paths whereby the operation of the correct two relays in said register circuit during each registration effects the operation of said check circuit.

10. In combination, a register circuit comprising five relays adapted to be operated in two-out-of-five code form to register any one of the digits 0 through 9 therein, a sending circuit remotely located from said register circuit and containing ten selectively operable switching means each of which represents one of digits 0 through 9, signal paths interconnecting said register circuit and said sending circuit, means whereby the operation of one of said switching means effects the operation of the two relays in said register circuit which represent in two-out-of-five code form the digit represented by said operated switching means, a check circuit associated with said sending circuit, means including said signal paths whereby the operation of the correct two relays in said register circuit during each registration effects the operation of said check circuit, a second check circuit associated with said sending circuit, and means whereby the operation of an unwanted register relay during a registration effects the operation of said second check circuit.

11. In combination, a register circuit comprising five relays adapted to be operated in two-out-of-five code form to register any one of the digits 0 through 9 therein, a sending circuit remotely located from said register circuit and containing selectively operable digit representing switching means, signal paths interconnecting said register circuit and said sending circuit, means whereby the operation of said switching means effects the operation of the two relays in said register circuit which represent in two-out-of-five code form the digit represented by said operated switching means, a check circuit operatively associated with said sending circuit, and means including said signal paths whereby the operation of the correct two relays in said register circuit during a registration effects the operation of said check circuit.

12. In combination, a register circuit comprising five relays adapted to be operated in two-out-of-five code form to register any one of the digits 0 through 9 therein, a sending circuit remotely located from said register circuit and containing selectively operable digit representing switching means, signal paths interconnecteing said register circuit and said sending circuit, means whereby the operation of said switching means effects the operation of the two relays in said register circuit which represent in two-out-of-five code form the digit represented by said operated switching means, a check circuit operatively associated with said sending circuit, means including said signal paths whereby the operation of the correct two relays in said register circuit during a registration effects the operation of said check circuit, a second check circuit associated with said sending circuit, and means responsive to the operation of an unwanted register relay during a registration to operate said second check circuit.

13. In combination, a register circuit comprising a plurality of relays adapted to be operated in combinational code form, a sending circuit remotely located from said register circuit and containing selectively operable data representing switching means, signal paths interconnecting said register circuit and said sending circuit, means whereby the operation of said switching means effects the operation of the relays in said register circuit which together represent the data represented by said operated switching means, a check circuit associated with said sending circuit, and means including said signal paths whereby the operation of the correct relays in said register circuit during a registration effects the operation of said check circuit.

14. In combination, a register circuit comprising a plurality of relays adapted to be operated in combinational code form, a sending circuit remotely located from said register circuit and containing selectively operable data representing switching means, signal paths interconnecting said register circuit and said sending circuit, means whereby the operation of said switching means effects the operation of the relays in said register circuit which together represent the data represented by said operated switching means, a check circuit operatively associated with said sending circuit, means including said signal paths whereby the operation of the correct relays in said register circuit during a registration effects the operation of said check circuit, a second check circuit associated with said sending circuit, and means responsive to the operation of an unwanted register relay during a registration to operate said second check circuit.

15. In combination, a register circuit comprising five relays adapted to be operated in two-out-of-five code form to register any one of the digits 0 through 9 therein, a sending circuit remotely located from said register circuit and containing five switching means selectively operable in combination to represent the digits 0 through 9, signal paths interconnecting said register circuit and said sending circuit, means whereby the operation of said switching means effects the operation of the two relays in said register circuit which represent in two-out-of-five code form the digit represented by said operated switching means, a check circuit associated with said sending circuit, and means including said signal paths whereby the operation of the correct two relays in said register circuit during a registration effects the operation of said check circuit.

16. In combination, a register circuit comprising five relays adapted to be operated in two-out-of-five code form to register any one of the digits 0 through 9 therein, a sending circuit remotely located from said register circuit and containing five switching means selectively operable in combination to represent the digits 0 through 9, signal paths interconnecting said register circuit and said sending circuit, means whereby the operation of said switching means effects the operation of the two relays in said register circuit which represent in two-out-of-five code form the digit represented by said operated switching means, a check circuit associated with said sending circuit, means including said signal paths whereby the operation of the correct two relays in said register circuit during a registration effects the operation of said check circuit, a second check circuit associated with said sending circuit, and means responsive to the operation of an unwanted register relay during a registration to operate said second check circuit.

17. In combination, a register having a plurality of orders each of which comprises five relays adapted to be operated in two-out-of-five code form to register any one of the digits 0 through 9, a plural order sending circuit remotely located from said register and containing ten selectively operable switching means per order each of which represents one of digits 0 through 9, signal paths interconnecting said register and said sending circuit, means whereby the operation of one of said switching means in each order effects the operation of the two relays in the corresponding orders of said register which represent in two-out-of-five code form the digits represented by said operated switching means, a check circuit operatively associated with said sending circuit, and means including said signal paths whereby the operation of the correct two relays in each order of said register during each resigstration effects the operation of said check circuit.

18. In combination, a register having a plurality of orders each of which comprises five relays adapted to be operated in two-out-of-five code form to register any one of the digits 0 through 9, a plural order sending circuit remotely located from said register and containing five switching means per order with the switching means in each order being selectively operable to represent one of digits 0 through 9 in the two-out-of-five code, signal paths interconnecting said register and said sending circuit, means whereby the selective operation of the switching means in each order effects the operation of the two relays in the corresponding orders of said register to represent in two-out-of-five code form the digits represented by said operated switching means, a check circuit associated with said sending circuit, and means including said signal paths whereby the operation of the correct two relays in each order of said register during each registration effects the operation of said check circuit.

References Cited in the file of this patent
UNITED STATES PATENTS

| | | |
|---|---|---|
| 2,460,702 | Mallery | Feb. 1, 1949 |
| 2,470,145 | Clos | May 17, 1949 |
| 2,550,600 | Rehm | Apr. 24, 1951 |
| 2,675,538 | Malthaner et al. | Apr. 13, 1954 |
| 2,675,539 | McGuigan | Apr. 13, 1954 |